United States Patent [19]

Miller

[11] 4,171,210
[45] Oct. 16, 1979

[54] UNIT FILTER INCLUDING FILTER RETAINING MEANS

[75] Inventor: Jerry D. Miller, Louisville, Ky.

[73] Assignee: American Air Filter Company, Inc., Louisville, Ky.

[21] Appl. No.: 956,493

[22] Filed: Nov. 1, 1978

[51] Int. Cl.² .................. B01D 46/10; B01D 35/12
[52] U.S. Cl. ........................... 55/481; 55/493; 55/504; 55/506; 160/371
[58] Field of Search ....................... 55/478–481, 55/493, 504, 506, 507, 509, 513, 422; 160/371

[56] References Cited

U.S. PATENT DOCUMENTS

| 991,572 | 5/1911 | Weisenstein | 55/480 |
| 2,062,649 | 12/1936 | Hegan | 55/493 |
| 2,881,854 | 4/1959 | Vehre, Jr. | 55/480 |
| 3,114,307 | 12/1963 | Hugoson | 55/481 |
| 4,124,362 | 11/1978 | Westlin et al. | 55/509 |

Primary Examiner—David L. Lacey
Attorney, Agent, or Firm—Jon C. Winger

[57] ABSTRACT

A filter retaining device to prevent a unit filter from inadvertently falling out of a bottom access flow-through housing when the housing is opened to gain access to the interior. Bottom access flow-through filter housings typically include spaced apart elongated channels which slidably receive a unit filter. These channels serve to locate and hold a unit filter in a gas stream passing through the flow-through housing. The filter retaining means is removably attached to the bottom open end of each channel to support the unit filter in the flow-through housing when the bottom access is opened to gain access to the interior of the filter housing.

7 Claims, 4 Drawing Figures

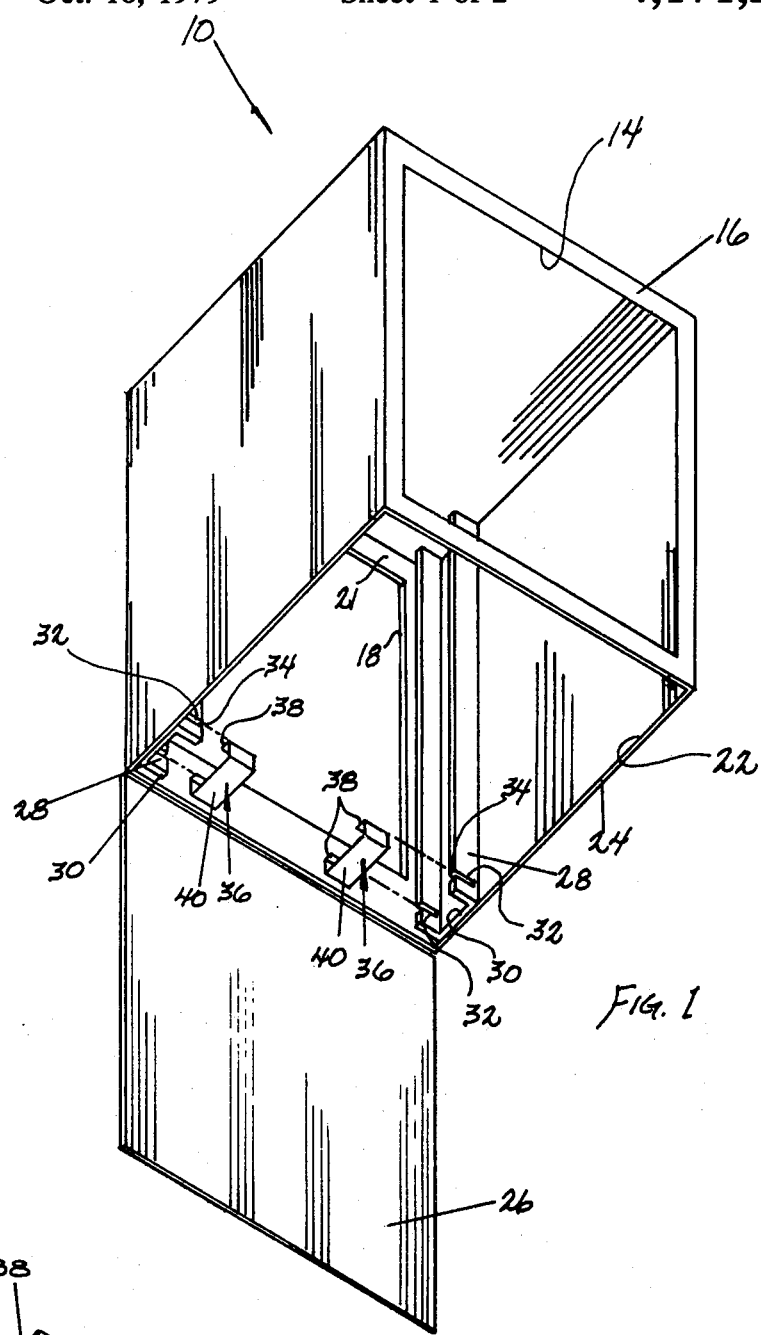
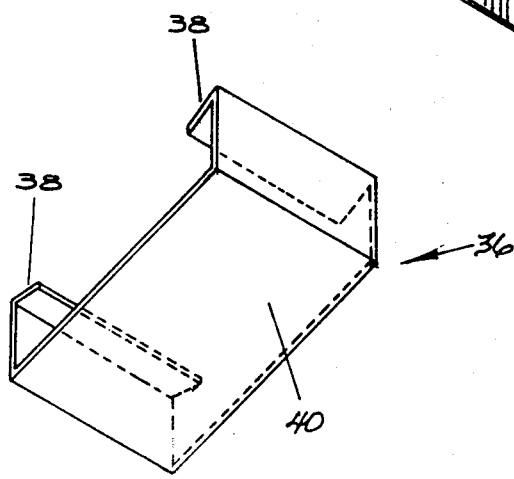

UNIT FILTER INCLUDING FILTER RETAINING MEANS

BACKGROUND OF THE INVENTION

The present invention relates to retainers for supporting unit filters in a filter housing, and more particular to a bottom support retaining means for a traytype unit filter cell installed in a bottom access flow-through filter housing.

Bottom access gas flow-through filter housings are widely used in air cooling, heating and ventilation systems which are located in a building because they provide for easy and ready access to the filter located in the housing. The bottom access flow-through housings typically have a sliding panel or hinged door providing the closure over the bottom access aperture in the flow-through filter housing. It is this sliding panel or door which engages the bottom of the unit filter in the flow-through housing. However, when the sliding panel is removed or the door opened, nothing supports the unit filter. If one is not careful, or very dexterous when opening the door or removing the panel the unit filter will fall out of the flow-through housing through the open bottom access aperture. By the same token, when installing a new unit filter in the heretofore known bottom access filter housing the person doing the installation must somehow manually hold the unit filter up in the housing while attempting to slide the closure panel or moving the door across the access aperture.

A need exists for a means for retaining a unit filter in a bottom access flow-through filter housing when the panel, door or other closure means is removed from the bottom access aperture of the housing.

SUMMARY OF THE INVENTION

The present invention recognizes this need and provides a solution which is inexpensive to manufacture and easy to use.

More particularly, the present invention provides in a gas filter assembly of the type having a unit filter cell for removing contaminants from a gas stream flowing therethrough; a filter housing for receiving the unit filter cell having a gas inlet opening in one side wall and a gas outlet opening in the opposite side wall to form a gas passage through the filter housing and a closable access port in the bottom wall for providing access to the interior of the filter housing through which the unit filter cell is installed and removed; and a pair of spaced apart generally parallel channels disposed within the filter housing and extending longitudinally across the filter housing from the access port on opposite sides of the gas inlet opening, each channel having an open end at the access port, the pair of channels receiving, through their open ends, the opposite margins of the unit filter cell to hold the unit filter cell in position across the gas inlet openin; the improvement comprising:

filter cell retaining means removably connected to each channel at the open end of each channel to prevent the unit filter cell from inadvertently falling out of the filter housing through the access port upon opening of the access port.

DESCRIPTION OF THE DRAWINGS

A preferred embodiment of the present invention is illustrated in the accompanying drawings, wherein like numerals refer to like parts throughout the several views, and in which:

FIG. 1 is a partially cut-away and exploded perspective view a flow-through bottom access filter housing employing the filter retaining means of the present invention;

FIG. 3 is an enlarged perspective view of the present invention; and,

DETAILED DESCRIPTION OF THE PREFERRED EMBODIMENT

Figure 2:
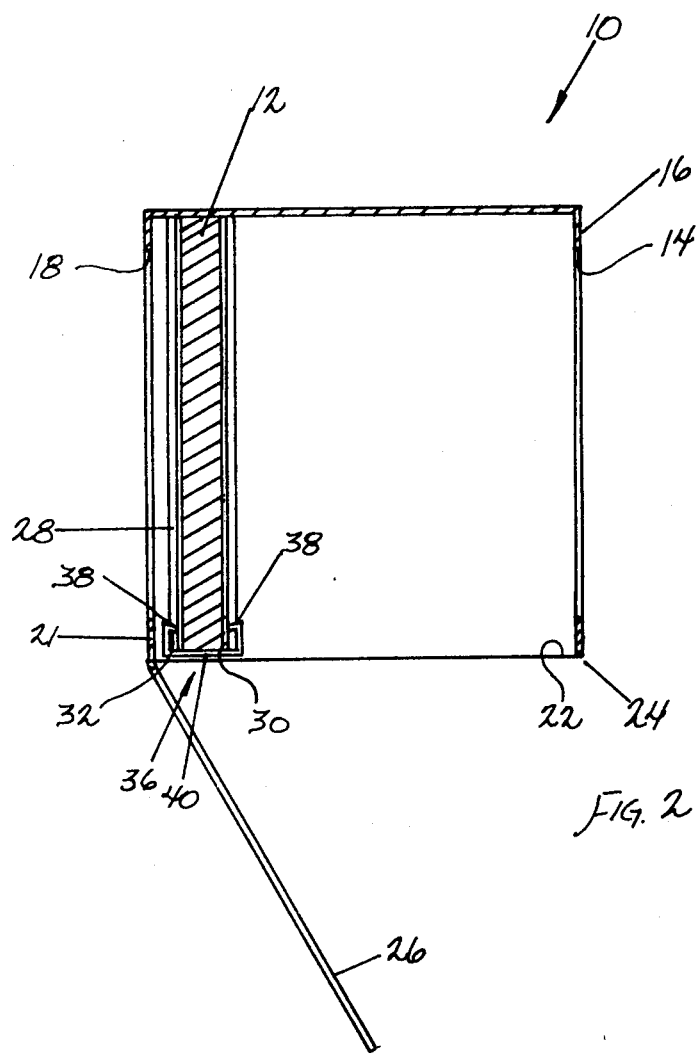
FIG. 2 is an enlarged transverse cross-section view of the filter housing of FIG. 1 illustrating a unit filter cell supported therein by the filter retaining means of the present invention.
Figure 4:
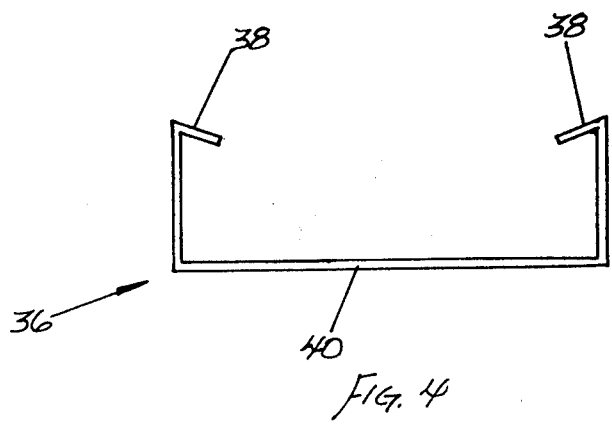
FIG. 4 is a side view of the present invention.

FIGS. 1 and 2 illustrate a bottom access gas flow-through filter housing 10 while FIG. 2 shows a unit filter cell 12 installed in the flow-through filter housing 10. The flow-through filter housing 10 is typically rectangular in shape and has a gas inlet opening 14 in one side wall 16 and a gas outlet opening 18 in the opposite side wall 21 to form a gas passage through the filter housing. A closable access port or aperture 22 is formed in the bottom 24 for providing access to the interior of the filter housing 10. A panel or door 26 provides the closure over the access port 22.

With continued reference to FIGS. 1 and 2, the filter housing 10 also includes a pair of vertically oriented generally parallel channels 28 disposed within the filter housing 10. The channels extend longitudinally across the filter housing from the access port 22 on opposite sides of the gas outlet opening 18. Each channel 28 has an open end 30 at the access port 22. Each channel 28 is preferably generally U-shaped in transverse cross-section. The channels 28 receive, through their open ends 30, the opposite margins of the unit filter cell 12 to hold the unit filter cell 12 in position across the gas outlet opening 18 so that a gas stream passing through the filter housing 10 from the gas inlet opening 14 to the gas outlet opening 18 must pass through the unit filter cell 12.

With reference to FIGS. 1 and 3, each of the channels 28 is formed with a pair of generally parallel slots 32 formed on opposite sides of the channel in the legs of the channel proximate the open end 30 of the channel. The slots 32 are generally perpendicular to the longitudinal axis of the channel and are each open at one end, as at the numeral 34, to the free edge of the leg of the channel in which it is formed.

With reference to FIGS. 1, 2, 3, and 4, filter cell retaining means such as a generally U-shaped strap 36 is removably connected to each channel 28 at the open end 30. Preferably, the U-shaped strap 36 is formed with flanges 38 at its opposite ends which slidably engage in the slots 32 in the channel 28. The flanges 38 are preferably formed in the free ends of the legs of the U-shaped strap 36 in position with its flanges 38 seated in the slots 32, the base portion 40 of the U-shape between the legs of the U-shape spans the open end 30 of the channels 28.

After a unit filter cell 12 is slid into position in the channels 28 in the filter housing 10, a U-shaped filter retainer strap 36 is attached to each of the channels 28 by sliding the flanges 38 into the slots 32 through their open ends 34. The bottom of the unit filter cell 12 is allowed to rest on the base portion 40 of the straps 36. The inwardly projecting flanges 38 abut the margin of the slots and support the filter cell 12 in place. The panel or door 26 is then closed over the bottom access aperture or port 22.

To remove a unit filter cell 12 from the filter housing 10, the panel or door 26 is opened and the straps 36 are removed by sliding them out of the slots 32 through the open ends 34 of the slots while manually supporting the filter cell 12.

The foregoing detailed description is given primarily for clearness of understanding and no unnecessary limitations should be understood therefrom for modifications will be obvious to those skilled in the art upon reading this disclosure and may be made without departing from the spirit of the invention or scope of the appended claims.

I claim:

1. In a gas filter assembly having a unit filter cell for removing contaminants from a gas stream flowing therethrough; a filter housing for receiving the unit filter cell having a gas inlet opening in one side wall and a gas outlet opening the opposite side wall to form a gas passage through the filter housing and a closable access port in the bottom wall for providing access to the interior of the filter housing through which the unit filter cell is installed and removed; and a pair of spaced apart generally parallel channels disposed within the filter housing and extending longitudinally across the filter housing from the access port on opposite sides of the gas inlet opening, each channel having an open end at the access port, the pair of channels receiving, through their open ends, the opposite margins of the unit filter cell to hold the unit filter cell in position across the gas inlet opening; the improvement comprising;

filter cell retaining means removably connected to each channel to prevent the unit filter cell from inadvertently falling out of the filter housing through the access port upon opening of the access port.

2. The gas filter assembly of claim 1, wherein the filter retaining means at least partially closes the open end of each channel.

3. The gas filter assembly of claim 1, wherein the filter retaining means is a strap extending across the open end of each channel.

4. The gas filter assembly of claim 3, wherein the filter retaining strap is removably connected at each of its opposite ends to the open end of each channel.

5. The gas filter assembly of claim 4, wherein each channel is formed with a pair of generally parallel slots disposed on opposite sides of each channel; and, each filter retaining strap is formed with flanges at its opposite ends for removably engaging into said slots.

6. The gas filter assembly of claim 5, wherein each filter retainer strap is generally U-shaped in cross-section and the flanges are formed in the free ends of the legs of the U-shape.

7. The gas filter assembly of claim 6, wherein the flanges formed at the free ends of the legs of the U-shaped filter retainer strap project generally inwardly of the U-shape.

* * * * *